United States Patent [19]

Oki et al.

[11] Patent Number: 5,208,293

[45] Date of Patent: May 4, 1993

[54] RUBBER COMPOSITION HAVING LOW FRICTION

[75] Inventors: Yoshio Oki, Yokkaichi; Kazutoshi Sugitani; Takeo Kaneko, both of Yokohama; Yukimasa Shimizu; Hidetsugu Yagi, both of Hofu, all of Japan

[73] Assignee: NTN Engineering Plastics Corporation, Osaka, Japan

[21] Appl. No.: 603,481

[22] Filed: Oct. 26, 1990

[30] Foreign Application Priority Data

Jan. 29, 1990 [JP] Japan ................................ 2-19976

[51] Int. Cl.⁵ ...................... C08L 27/12; C08L 27/16; C08L 27/18; C08L 27/20
[52] U.S. Cl. ..................................... 525/199; 525/200
[58] Field of Search .............................. 525/199, 200

[56] References Cited

U.S. PATENT DOCUMENTS 4,914,158  4/1990  Yoshimura et al. ................. 525/199

FOREIGN PATENT DOCUMENTS 0105433  4/1984  European Pat. Off. ........... 525/199
0310966  4/1989  European Pat. Off. ........... 525/199

*Primary Examiner*—James J. Seidleck
*Assistant Examiner*—W. R. M. Clark
*Attorney, Agent, or Firm*—Armstrong, Westerman, Hattori, McLeland & Naughton

[57] ABSTRACT

A rubber composition having low friction is proposed which contains a thermoplastic fluororesin, a thermosetting fluororubber and a low-molecular weight fluorine-containing polymer.

4 Claims, No Drawings

RUBBER COMPOSITION HAVING LOW FRICTION

This invention relates to a rubber composition.

Because of their excellent oil resistance, abrasion resistance, rubber elasticity and mechanical strength, urethane rubber and diene rubber have heretofore been used in various fields, e.g. for an oil seal, glass run, a dust boot of a homokinetic joint, valves and a toner seal. Recently, with increases in the performance and speed of machines and automobiles, the materials used as sliding parts are required to have better lubricating properties. Also the noise produced by the machines used indoors such as copying machines, printers, facsimiles and computers is becoming a big problem This has created an increasing demand for rubber formings having a sound-damping function as well as excellent sliding properties. Also, with optical devices having semiconductor lasers, such as compact disks, video disks and optical files, it is necessary to read the information in the form of bits on the surface of the disk precisely at a spot where the laser beams are focused by a converging lens. For this purpose, there is an increasing demand for sliding materials having excellent lubricating properties and capable of effectively damping the vibration applied to these devices.

Various attempts have been made to meet these requirements. Such attempts include using synthetic resins having good lubricating properties, such as polyamide, polyacetal, polyolefin and fluororesin, and mixing various elastomers into these resins. But with these prior art methods, the inherent properties of rubber, such as sealing properties, followability, vibration-damping properties and sound-damping properties, have been scarcely utilized. Also, because of poor sliding properties, conventional diene rubber compositions had problems such as a large driving force needed, a large frictional sound produced and a large possibility of static slip. Further the frictional resistance tends to increase with a prolonged use. This will lead to the progression of abrasion and heat buildup at the sliding part. This might eventually cause the deformation of the rubber elastic body itself.

Various methods have been proposed to reduce the frictional resistance of a rubber elastic body. For example, Japanese Examined Patent Publication 46-23681 proposes to laminate a fluororesin film to the elastic body (hereinafter referred to as the laminating method). Japanese Examined Patent Publication 57-32950 proposes to heat-fuse an olefin resin to the elastic body (hereinafter referred to as the fusing method). Other conventional methods include applying a liquid prepared by dissolving a film-forming polymer in an organic solvent and dispersing a solid lubricant such as a fluororesin therein (application method), and mixing a solid lubricant such as a fluororesin and a lubricating oil such as a silicone oil separately or simultaneously into a rubber elastic body (mixing method).

Every one of these methods has its peculiar drawback as described below. Namely, with the application and fusing method, the adhesion of a fluororesin film or an olefin resin film to the substrate is extremely poor. Particularly, with a fluoroplastic film, surface treatment (by use of an alkali metal or by ion sputtering) is required. Even with a fluoroplastic film subjected to a surface treatment or with a olefin resin, its adhesion is so poor that it is liable to peel off while in use. Further, such films cannot be used for a forming having a complicated shape. Also, because such films are thick, they might have a bad influence on the inherent properties of the rubber elastic body, such as excellent sealing properties, flowability and vibration-damping properties. The application method is superior in adhesion to the laminating method and the fusing method. But in this method, because a polymer which inherently lacks lubricating properties is used, it is difficult to expect good lubricating properties. With the mixing method, if a solid lubricant is mixed in small amounts, the lubricating properties will be insufficient and if mixed in large amounts, it will disturb the inherent properties of the rubber elastic body. On the other hand, the object of the mixing method is to impart sliding properties by causing the lubricating oil to ooze while sliding. But this method has many problems, e.g. that it is difficult to stabilize the friction coefficient at a small value, that the oil tends to exude completely with a rise in temperature, that the formability is bad, the oil tends to separate during forming or kneading, that the properties of the substrate are badly influenced, that the sliding surface tends to be soiled with oil and dust and that if oil runs out, the sliding surface tends to abrade abnormally.

As described above, the prior art failed to offer a material which does not lower the inherent properties of a rubber elastic body, and which has a small and stable friction coefficient. A rubber elastic body, while having a lot of excellent properties, has not been used as a sliding material which is required to have a low friction coefficient.

It is an object of the present invention to provide a lubricating rubber composition which obviates the abovesaid shortcomings.

In accordance with the present invention, there is provided a lubricating rubber composition comprising a thermoplastic fluororesin as a first ingredient, a fluorine-containing elastomer as a second ingredient, and a low-molecular weight fluorine-containing polymer as a third ingredient.

The thermoplastic fluororesin as a first ingredient according to this invention is a polymer having carbon chains in the main chain and fluorine bonds in the side chain. It should preferably be one or more polymers selected from a group consisting of a tetrafluoroethylene polymer (hereinafter abbreviated to PTFE), a tetrafluoroethylene-perfluoroalkyl vinylether copolymer (hereinafter abbreviated to PFA), a tetrafluoroethylenehexafluoropropylene perfluoroalkyl vinylether copolymer (hereinafter abbreviated to EPE), a tetrafluoroethylenehexafluoropropylene copolymer (hereinafter abbreviated to FEP), a tetrafluoroethylene-ethylene copolymer (hereinafter abbreviated to ETFE), a trifluorochloroethylene polymer (hereinafter abbreviated to CTFE), a trifluorochloroethylene-ethylene copolymer (hereinafter abbreviated to ECTFE), a polyvinyl fluoride (hereinafter abbreviated to PVF), and a polyvinylidene fluoride (hereinafter abbreviated to PVDF).

Any of the above-mentioned resins may be made by various methods such as catalyzed emulsion polymerization, suspension polymerization, catalyzed solution polymerization, gas phase polymerization or ionized irradiation-induced polymerization. Their molar weight should be 50000 or less and preferably be more than 5000 and not more than 20000.

Examples which meet these conditions include PFA MP10 made by Mitsui-Dupont Fluoro Chemical, which is a PFA, Teflon FEP100 made by Mitsui-Dupont Fluoro Chemical, which is an FEP, Aflon COP made by Asahi Glass Co., Ltd. which is an ETFE, Neoflon CTFE made by Daikin Co., Ltd., which is a CTFE, KF Polymer made by Kureha Chemical Co., Ltd., which is a PVDF, and Tedlar made by Dupont, which is a PVF.

Among them, a tetrafluoroethylene-ethylene copolymer is most preferable and in particular one having a flow melt rate of 1–20 (g/10 min.) and preferably 1–7 (g/ten min.) at 300° C. under a load of 2160 grams as measured by an orifice 1 mm in diameter and 5 mm long are desirable. Its particle diameter should be 20 microns or less and preferably be about 5–10 microns for sufficient properties as an elastic body and good dispersibility. A typical example is Aflon COP made by Asahi Glass Co., Ltd., and having a crystalline melting point of 265°–270° C.

On the other hand, the fluorine-containing elastomer as the second ingredient of the present invention is not limited to a specific type. It may be made by bulk polymerization, suspension polymerization, emulsion polymerization, solution polymerization, catalyzed polymerization using a polymerization initiator, ionized irradiation-induced polymerization or redox polymerization.

Examples which meet these requirements are Aflas made by Asahi Glass Co., Ltd., which is a tetrafluoroethylenepropylene copolymer, Viton made by Dupont, which is a vinylidene fluoride-hexafluoropropylene copolymer, Technoflon made by Montefluos, which is a vinylidene fluoride-hexafluoropropylene-tetrafluoroethylene copolymer, Silastic LS made by Dow Corning which is a fluorosilicone elastomer, Perfluoro-Daiel made by Daikin Co., Ltd. which is a perfluoro elastomer.

The molecular weight of the copolymer should be about 50000 or more. Because the higher the molecular weight, the better the results, the copolymer may have a molecular weight of 70000 or more, preferably 100000–250000. As a typical example of such a tetrafluoroethylene-propylene copolymer, AFLAS made by Asahi Glass Co., Ltd. can be named.

The thermoplastic fluororesin as the first ingredient and the fluorine-containing elastomer as the second ingredient mainly serve to provide the characteristics as an elastic body. In order to impart good sliding properties to the rubber composition, it is necessary to add a low-molecular weight fluorine-containing polymer as a third essential ingredient. The low-molecular weight fluorine-containing polymer may be a fluoroolefin polymer such as tetrafluoroethylene (TFE) and tetrafluoroethylene-hexafluoropropylene copolymer (FEP), a fluoropolyether having a main structural unit of $-C_nF_{2n}-O-$ (n is 1, 2, 3 or 4) or a fluoroalkyl (carbon number 2–20) having a main structural unit of $CF_3(CF_2)$, $H(CF_2)_6$. Its molecular weight should be 50000 or less. Among them, a tetrafluoroethylene polymer given by the following formula

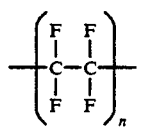

and having an average particle size of 5 microns or less is most preferable. For example, Vydax AR made by Dupont and Lubricant L169 made by Asahi Glass Co., Ltd. can be named as examples.

As the fluoropolyether having a main structural unit of $-C_nF_{2n}-O-$ (n is 1, 2, 3 or 4) and having an average molecular weight of 50000 or less, Fombrin Z25 made by Montefluos
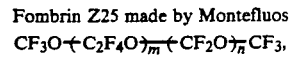

Fombrin Y25 made by Montefluos
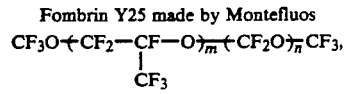

Demnum made by Daikin Co., Ltd.
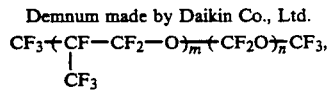

can be named as examples. In order to improve the affinity (or adhesion) with the other ingredients and additives, such fluoropolyether polymers should have units including functional groups such as isocyanate groups, hydroxyl groups, carboxyl groups and ester. Some examples are shown below:

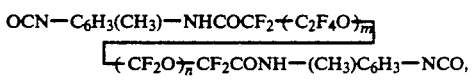

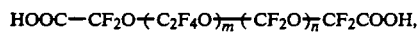

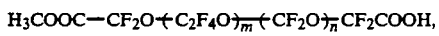

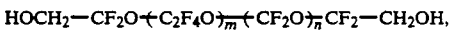

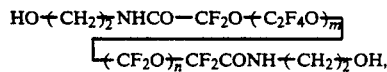

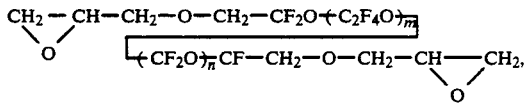

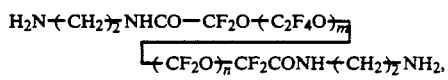

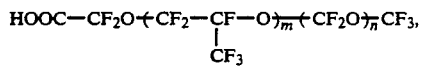

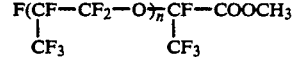

They may be used separately or in combination. Fluoropolyether having functional groups containing activated hydrogen may be used in combination with an isocyanate compound containing no polyfluoropolyether groups. Also, fluoropolyether having isocyanate groups may be used in combination with a diamine or a triamine not containing fluoropolyether groups or with a diol or a triol not containing fluoropolyether groups. It is especially preferable to combine fluoropolyethers having functional groups which tend to react with each other to increase the molecular weight. For example, it is preferable to combine one having units containing isocyanate groups with one having units containing hydroxyl groups.

The fluoroalkyl may be one having polyfluoroalkyl groups (carbon number of 2-20) such as

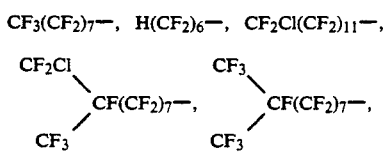

having an average molecular weight of 50000 or less. Examples are shown below:

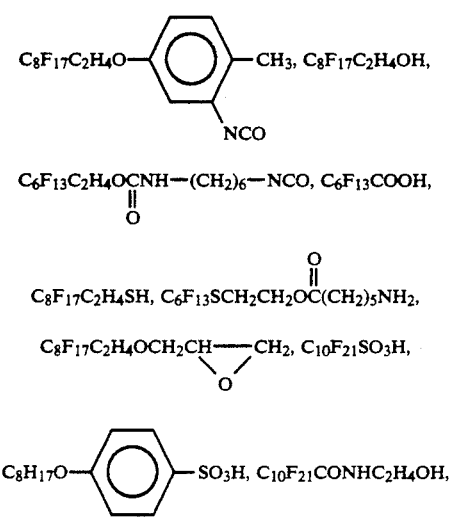

As with the above-described fluoropolyether, in order to improve the affinity with (or adhesion to) the other ingredients and additives, fluoroalkyls should preferably be polymers having units containing functional groups having a high affinity such as isocyanate, hydroxyl, mercapto, carboxyl, epoxy, amino or sulphone groups.

These fluoroalkyls may be used separately or in combination. A fluoroalkyl having reactive groups containing activated hydrogen may be used in combination with an isocyanate compound containing no polyfluoroalkyl groups. Also, a fluoroalkyl having isocyanate groups may be used in combination with a diamine or a triamine containing no polyfluoroalkyl groups or a diole or triole containing no polyfluoroalkyl groups. It is preferable to combine functional groups together because this leads to an increase in strength. More specifically, fluorine-containing polymers having polyfluoroalkyl groups (carbon number: 2-20) and at least one selected from hydroxyl, mercapto, carboxyl and amino groups may be combined together. Also, a fluorine-containing polymer having polyfluoroalkyl groups with a carbon number of 2-20 and having units containing isocyanate groups may be combined with a fluorine-containing polymer having polyfluoroalkyl groups with a carbon number of 2-20 and having units containing reactive groups having activated hydrogen.

The thermoplastic fluororesin, the fluorine-containing elastomer and the low-molecular weight fluorine-containing polymer should be mixed at such a rate that the weight ratio between the fluorine-containing elastomer and the thermoplastic fluororesin is from 50:50 to 95:5 and the low-molecular weight fluorine-containing polymer will be 5 to 50 parts by weight relative to 100 parts by weight of the fluorine-containing elastomer and the thermoplastic fluororesin. This is because if the content of the low-molecular weight fluorine-containing polymer is less than 5 parts by weight, it is difficult to expect sufficient lubricating properties, whereas if it is more than 50 parts by weight, the elasticity as a rubber member will be hampered.

In addition to the above-described ingredients, various additives and the like may be added as far as the object of this invention is not ruined. For example, isocyanurate which is known as an additive for a fluorine-containing elastomer, a crosslinking agent such as an organic peroxide, an antioxidant or acid acceptor such as sodium stearate, magnesium oxide and calcium hydroxide, an antistatic agent such as carbon, a filler such as silica and alumina, a metallic oxide, a coloring agent and a flame-retardant may be added as necessary.

These ingredients may be mixed in any desired or conventional manner. For example, resins as main ingredients and other ingredients may be put into a roll mill or mixer of other type one after another or all at once and mixed together. It is preferable to use a roll mill having a cooling mechanism to prevent the heat buildup owing to friction. If a roll mill is used, in the finishing stage of mixing, the distance between rolls should preferably be, narrowed to less than 3 mm.

The lubricating rubber composition according to the present invention has excellent lubricating properties as well as sufficient properties as an elastic body. Thus it can be advantageously used as a sliding material which is required to have not only inherent properties of rubber such as sealing properties, followability, sound-damping properties and vibration-damping properties but also a low friction coefficient.

The material used in the Examples and the Comparative Examples are shown below. The contents of the ingredients are given in weight percent. For items 6-18, the contents are given in weight percent with respect to the total weight of the materials shown in items 1-7.

1. tetrafluoroethylehe-ethylene copolymer [ETFE] (by Asahi Glass Co., Ltd.: Aflon COP),
2. tetrafluoroethylene-perfluoroalkylvinylether copolymer [PFA] (by Mitsui Dupont Fluoro Chemical: PFA-MP10)
3. tetrafluoroethylene-propylene copolymer (by Asahi Glass Co., Ltd.: AFLAS 150P),
4. vinylidene fluoride-fluoropropylene copolymer (by Montefluos: Technoflon FOR420),
5. vinylidene fluoride-fluoropropylene copolymer (by Dupont: Viton B50)
6. perfluoroelastomer (by Daikin: Perfluoro-Daiel)
7. low-molecular weight tetrafluoroethylene (by Asahi Glass Co., Ltd.: lubricant L169, average particle size; 5 microns),
8. Per-fluoropolyether (by Montefluos: Fombrin Z-doll)
9. high-molecular weight tetrafluoroethylene (by Mitsui-Dupont Fluoro Chemical: Teflon 7J, average molecular weight: 100000).
10. silicone resin (by Toray Dow silicone: Torayfil)
11. carbon (by Cancarb: MT carbon),
12. sodium stearate,
13. organic peroxide [α, α-bis(t-butyl peroxy) diisopropylbenzene],
14. polyfunctional monomer (triarylisocyanurate: TAIC),
15. magnesium oxide (reagent),
16. calcium hydroxide (reagent), 17. vulcanizing agent (by Dupont: qurative #20),
18. vulcanizing agent (by Dupont: qurative #30).

EXAMPLES 1-3

AFLAS e,crc/3/ was wound around rolls of a roll mill having the distance between rolls adjusted to 5-10 mm. Then sodium stearate ⊙ 12 , MT carbon ⊙ 11 , Aflon COP ① and TAIC ⊙ 14 were put in the mill in the contents shown in Table 1 and mixed together. Thereafter, the distance between rolls was adjusted to 1 mm and the above ingredients were masticated about ten times. In order to prevent frictional heat, cooling water was passed through rolls all the while to keep the temperature of the rolls at below 60° C. Then the supply of cooling water was stopped and steam was passed through the rolls to increase the rubber temperature to the range of 70° C.-90° C. Thereafter, the distance between rolls was widened again to 5-10 mm and the materials were mixed further while adding the low-molecular weight fluorine-containing polymers e,crc/7/ and e,crc/8/ little by little. The distance between rolls was again narrowed to 1 mm and the materials were masticated about ten times.

In the following steps, compounds in the form of sheets 300 mm wide, 300 mm long and 1 mm thick were subjected to first vulcanization (at 170° C., for 10 minutes, at pressure 7 kgf/cm$^2$) and second vulcanization (at 230° C., for 16 hours, free heating). The sheets thus vulcanized were tested for friction and wear properties and the properties as an elastic body. The tests were conducted in the following manner.

Test for the friction and wear properties:

The sheets obtained were punched to form annular members 21 mm in external diameter, 17 mm in internal diameter and 1 mm in thickness. Each annular member was bonded to an aluminum jig 21 mm in external diameter, 17 mm in internal diameter and 10 mm in thickness. The assemblies thus made were subjected as specimens to the friction abrasion test. The friction coefficient of each specimen was measured by use of a thrust type friction tester at a sliding speed of m/minute and a surface pressure of 3 kgf/cm$^2$. The wear coefficient of each specimen was measured by use of a thrust type wear tester at a sliding speed of 30 meters/minute and a surface pressure of 3.3 kgf/cm$^2$. In either of the tests, a bearing steel (SUJ2) was used as the mating material. The results are shown in Table 2. Test for properties as an elastic body:

The sheet-shaped specimens obtained were checked for tensile strength at break, elongation at break and hardness under JIS-K6301. The results are shown in Table 2.

EXAMPLE 4

In this example, the manufacturing conditions, the way of preparing the specimens and the testing method were the same as in the Examples 1 - 3. Only differences are that in Example 4, PFA ② was added in the ratios shown in Table 1. The results are shown in Table 2.

EXAMPLES 5-8

The Examples 5-8 have the compositions as shown in Table 1 and are the same as the Examples 1-3 in the processing conditions, the manner of preparation of the test pieces and the manner for conducting the test. The results obtained are shown in Table 2.

COMPARATIVE EXAMPLES 1-9

As shown in Table 1, in the Comparative Examples 1-9, sheet-shaped specimens were prepared in the same manner as in the Example 1 except that the materials used are different. The specimens in the form of sheets were put to the same test as in the Examples. The results are shown in Table 2.

As will be apparent from Table 2, Comparative Examples 1-5, which contain AFLAS as a main ingredient, Comparative Examples 6-8, which contain TECNOFLON as a main ingredient and Comparative Example 9, which contains VITON as a main ingredient, all turned out to have friction coefficients of 0.75 or more, which are larger than those for the Examples 1-5 (0.25-0.31). Also their abrasion coefficients were found to be larger than those of the Examples.

In Examples 1-3, though a tetrofluoroethylene-ethylene copolymer and a tetrafluoroethylene-propylene copolymer were mixed in the same ratio as in Comparative Example 1, a low-molecular weight fluorine-containing polymer was added at a rate of 10-30 per cent. They turned out to have not only sufficient characteristics as elastic bodies but also excellent sliding properties. Namely, they showed friction coefficients of 0.31 or less and abrasion coefficients of $60 \times 10^{-10}$ cm$^3$/kgf m or less. Examples 4 to 8 prepared in similar manners according to the present invention also exhibited excellent sliding properties as well as good properties as elastic bodies.

TABLE 1

Composition Of Examples and Comparative Examples

| No. | ETFE (1) | PFA (2) | AFLAS (3) | TECNOFLON (4) | VITON (5) | Per-Fluoro Daiel (6) | L169 (7) | Fombrin Z-doll (8) | Teflon 7J (9) | Torayfil (10) | MT carbon (11) | sodium stearate (12) | organic peroxide (13) | TAIC (14) | MgO (15) | Ca(OH)2 (16) | Qurative #20 (17) | Qurative #30 (18) |
|---|---|---|---|---|---|---|---|---|---|---|---|---|---|---|---|---|---|---|
| *Example* | | | | | | | | | | | | | | | | | | |
| 1 | 30 | | 70 | | | | 10 | | | | 5 | 1 | 1 | 5 | | | | |
| 2 | 30 | | 70 | | | | 30 | | | | 5 | 1 | 1 | 5 | | | | |
| 3 | 30 | | 70 | | | | | 10 | | | 5 | 1 | 1 | 5 | | | | |
| 4 | | 30 | 70 | | | | 30 | | | | 5 | 1 | 1 | 5 | | | | |
| 5 | 30 | | | 70 | | | 30 | | | | 5 | 1 | | | 3 | 6 | | |
| 6 | | 30 | | 70 | | | 30 | | | | 5 | 1 | | | 3 | 6 | | |
| 7 | 30 | | | | 70 | | 30 | | | | 5 | 1 | | | 3 | 6 | | |
| 8 | 30 | | | | | 70 | 30 | | | | 5 | 1 | 1 | 5 | | | 2 | 3.5 |
| *Comparative Example* | | | | | | | | | | | | | | | | | | |
| 1 | 30 | | 70 | | | | | | | | 5 | 1 | 1 | 5 | | | | |
| 2 | | 30 | 70 | | | | | | | | 5 | 1 | 1 | 5 | | | | |
| 3 | 30 | | 70 | | | | | | 30 | | 5 | 1 | 1 | 5 | | | | |
| 4 | 30 | | 70 | | | | | | | 30 | 5 | 1 | 1 | 5 | | | | |
| 5 | | | 100 | | | | | | | | 5 | 1 | 1 | 5 | | | | |
| 6 | 30 | | | 70 | | | | | | | 5 | 1 | | | 3 | 6 | | |
| 7 | | 30 | | 70 | | | | | | | 5 | 1 | | | 3 | 6 | | |
| 8 | 30 | | | 70 | | | 30 | | | | 5 | 1 | | | 3 | 6 | | |
| 9 | 30 | | | | 70 | | | | | | 5 | 1 | | | 3 | 6 | 2 | 3.5 |

*Percentage of Contents (7)~(18) are parts by weight relative to 100 parts by total weights of Contents (1)~(6).

TABLE 2

| No. | Friction Coefficient | Wear Coefficient $\times 10^{-10}$ cm$^3$/kgfm | Tensile Strength Kgf/cm$^2$ | Elongation % | Hardness JIS-A |
|---|---|---|---|---|---|
| *Example* | | | | | |
| 1 | 0.27 | 40 | 130 | 250 | 75 |
| 2 | 0.25 | 25 | 120 | 200 | 85 |
| 3 | 0.31 | 60 | 120 | 200 | 85 |
| 4 | 0.3 | 60 | 120 | 200 | 85 |
| 5 | 0.25 | 25 | 110 | 200 | 85 |
| 6 | 0.3 | 60 | 100 | 200 | 85 |
| 7 | 0.26 | 25 | 120 | 200 | 85 |
| 8 | 0.3 | 60 | 105 | 170 | 85 |
| *Comparative Example* | | | | | |
| 1 | 0.9 | >1000 | 150 | 300 | 75 |
| 2 | 1.05 | >1000 | 150 | 300 | 75 |
| 3 | 0.75 | 400 | 90 | 150 | 85 |
| 4 | 0.9 | 500 | 120 | 200 | 85 |
| 5 | >1.50 | >1000 | 150 | 350 | 70 |
| 6 | 0.89 | >1000 | 130 | 250 | 75 |
| 7 | 0.99 | >1000 | 130 | 250 | 75 |
| 8 | 0.85 | >1000 | 135 | 260 | 75 |
| 9 | 1.2 | >1000 | 120 | 200 | 80 |

What is claimed is:

1. A rubber composition comprising at least one thermoplastic fluororesin as a first ingredient selected from the group consisting of a tetrafluoroethylene-ethylene copolymer, a tetrafluoroethylene-perfluoroalkyl vinylether copolymer and a tetrafluoroethylene-hexafluoropropylene copolymer, a thermoset fluororubber as a second ingredient, and a tetrafluoroethylene polymer as a third ingredient represented by formula $$-(CF_2-CF_2)_{\overline{n}}.$$

2. A rubber composition as claimed in claim 1, wherein said tetrafluoroethylene polymer as the third ingredient has an average particle size of 5 microns or less.

3. A rubber composition as, wherein said thermoset fluororubber as the second ingredient is at least one polymer selected from the group consisting of a tetrafluoroethylenepropylene copolymer, a vinyldidene fluoride-hexafluoropropylene copolymer, and a vinylidene fluoride-hexafluoropropylene-tetrafluoroethylene copolymer.

4. A rubber composition as claimed in claim 1, wherein said tetrafluoroethylene-ethylene copolymer has a flow melt rate of 1–20 g/10 minutes at 300° C. under a load of 2160 grams.

* * * * *

UNITED STATES PATENT AND TRADEMARK OFFICE
CERTIFICATE OF CORRECTION

PATENT NO.:     5,208,293
DATED     :     May 4, 1993
INVENTOR(S):    OKI et al

It is certified that error appears in the above-identified patent and that said Letters Patent is hereby corrected as shown below:

On the title page, Item [73], "NTN Engineering Plastics Corporation, Osaka, Japan" should read --NTN Corporation, Osaka, Japan--.

Signed and Sealed this

Thirty-first Day of May, 1994

Attest:

BRUCE LEHMAN

*Attesting Officer*                *Commissioner of Patents and Trademarks*